US011548103B2

(12) United States Patent
Lehto et al.

(10) Patent No.: US 11,548,103 B2
(45) Date of Patent: Jan. 10, 2023

(54) MOBILE PRESSURE TOOL FOR ROTOR BLADE PROCESSES

(71) Applicant: Sikorsky Aircraft Corporation, Stratford, CT (US)

(72) Inventors: Ryan Lehto, Crowley, TX (US); David W. Littlejohn, Fort Worth, TX (US); Sven R. Lofstrom, Irving, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 158 days.

(21) Appl. No.: 17/075,531

(22) Filed: Oct. 20, 2020

(65) Prior Publication Data

US 2021/0046591 A1 Feb. 18, 2021

Related U.S. Application Data

(62) Division of application No. 15/643,649, filed on Jul. 7, 2017, now Pat. No. 10,836,001.

(60) Provisional application No. 62/359,735, filed on Jul. 8, 2016.

(51) Int. Cl.
*B23P 6/00* (2006.01)
*F01D 5/00* (2006.01)
*B29C 73/10* (2006.01)
*B29C 73/30* (2006.01)
*F01D 25/28* (2006.01)

(52) U.S. Cl.
CPC .............. *B23P 6/007* (2013.01); *B29C 73/10* (2013.01); *B29C 73/30* (2013.01); *F01D 5/005* (2013.01); *F01D 25/285* (2013.01); *F05D 2230/80* (2013.01)

(58) Field of Classification Search
CPC ........... B23P 6/00; B23P 6/6007; B23P 19/00; B23P 19/10; B23P 21/00; B23P 23/00; B23Q 3/00; B23Q 1/00; B23Q 1/01; B23Q 3/06
See application file for complete search history.

(56) References Cited

U.S. PATENT DOCUMENTS 3,730,366 A * 5/1973 Berends ..................... B60P 1/02
414/495
3,996,091 A 12/1976 Daunt et al.
5,846,362 A 12/1998 Chung
(Continued)

OTHER PUBLICATIONS

Final Office Action for U.S. Appl. No. 15/643,649 dated Mar. 23, 2020 (10 pages).
(Continued)

*Primary Examiner* — Lee D Wilson
(74) *Attorney, Agent, or Firm* — Foley & Lardner LLP

(57) ABSTRACT

A pressure tool for rotor blade repair including a mobile support system including a support surface, a first bladder support assembly including a first inflatable bladder fixedly mounted to the support surface, a second bladder support assembly including a second inflatable bladder pivotally mounted relative to the support surface, and an activation mechanism operatively coupled to the second bladder support assembly. The activation mechanism is operable to selectively shift the second bladder support assembly relative to the first bladder support assembly. A fluid delivery system is operable to direct a fluid into each of the first inflatable bladder and the second inflatable bladder.

19 Claims, 3 Drawing Sheets

(56) References Cited

U.S. PATENT DOCUMENTS

| | | | |
|---|---|---|---|
| 6,170,141 B1 | 1/2001 | Rossway et al. | |
| 8,726,965 B2 | 5/2014 | Marquardt | |
| 11,066,188 B2* | 7/2021 | Lofstrom | B64F 5/40 |
| 2004/0256045 A1 | 12/2004 | Reis et al. | |
| 2009/0140222 A1* | 6/2009 | Schwarz | A47F 1/06 |
| | | | 414/800 |
| 2010/0243152 A1 | 9/2010 | Helfrich et al. | |
| 2014/0115894 A1* | 5/2014 | Gamboa | B25B 11/00 |
| | | | 269/21 |
| 2014/0250675 A1 | 9/2014 | Sherrill et al. | |
| 2014/0353894 A1* | 12/2014 | DesJardien | B23Q 1/035 |
| | | | 269/21 |
| 2021/0046591 A1* | 2/2021 | Lehto | F01D 5/005 |

OTHER PUBLICATIONS

Non-Final Office Action for U.S. Appl. No. 15/643,649 dated Sep. 17, 2019 (10 pages).

Notice of Allowance for U.S. Appl. No. 15/643,649 dated Jul. 14, 2020 (8 pages).

\* cited by examiner

MOBILE PRESSURE TOOL FOR ROTOR BLADE PROCESSES

CROSS REFERENCE TO RELATED APPLICATIONS

This application is a divisional of U.S. patent application Ser. No. 15/643,649, filed Jul. 7, 2017, which claims priority to U.S. Provisional Patent Application Ser. No. 62/359,735, filed on Jul. 8, 2016 the contents of which are incorporated herein in their entirety by reference.

BACKGROUND

Exemplary embodiments pertain to the art of rotor blade process tools and, more particularly to a mobile pressure tool for rotor blade processes.

Rotary wing aircraft include rotor blades that provide a motive force including both a lifting force and/or a propulsive force. Over time, rotor blades may experience foreign object damage (FOD). FOD may cause delamination, cracks, holes and the like in one or more blade surfaces. Additionally, rotor blades may wear as a result of frictional forces and entrained particles during operation.

Repair methods often include an application of pressure or a combination of pressure and heat to an area under repair. The pressure and/or heat to activate an adhesive and secure a repair patch to a surface of the rotor blade. At a depot, pressure may be applied by bladder tools that are moved into place with a crane. Multiple operators position the bladder tools at the area to be repaired, bring the bladder tools together and apply force. Field repairs often employ a vacuum bag to apply a desired pressure force.

BRIEF DESCRIPTION

Disclosed is a pressure tool for rotor blade repair including a mobile support system including a support surface, a first bladder support assembly including a first inflatable bladder fixedly mounted to the support surface, a second bladder support assembly including a second inflatable bladder pivotally mounted relative to the support surface, and an activation mechanism operatively coupled to the second bladder support assembly. The activation mechanism is operable to selectively shift the second bladder support assembly relative to the first bladder support assembly. A fluid delivery system is operable to direct a fluid into each of the first inflatable bladder and the second inflatable bladder.

In addition to one or more of the features described above or below, or as an alternative, further embodiments could include wherein the first inflatable bladder is fluidically connected to the second inflatable bladder.

In addition to one or more of the features described above or below, or as an alternative, further embodiments could include a base member operatively coupled to the support surface.

In addition to one or more of the features described above or below, or as an alternative, further embodiments could include a platform operatively coupled to the base member.

In addition to one or more of the features described above or below, or as an alternative, further embodiments could include an adjustment mechanism operable to shift the first platform relative to the base member.

In addition to one or more of the features described above or below, or as an alternative, further embodiments could include wherein the adjustment mechanism comprises a screw jack.

In addition to one or more of the features described above or below, or as an alternative, further embodiments could include wherein the base member includes one or more wheel assemblies operable to moveably support the mobile support system on a support surface.

In addition to one or more of the features described above or below, or as an alternative, further embodiments could include at least one latch member operatively coupled to one of the first and second bladder support assemblies, the at least one latch member being operable to secure the first bladder support assembly to the second bladder support assembly.

In addition to one or more of the features described above or below, or as an alternative, further embodiments could include wherein the at least one latch member includes a first portion mounted to the second bladder support assembly and a second portion fixedly mounted relative to the first bladder support assembly, the first portion including a tension adjustment member operable to establish a desired pressure between the first bladder support assembly and the second bladder support assembly.

In addition to one or more of the features described above or below, or as an alternative, further embodiments could include first and second support arms supporting the first bladder support assembly, the second portion of the at least one latch member projecting outwardly of one of the first and second support arms.

Also disclosed is a method of repairing a rotor blade including rolling a pressure tool mounted to a cart to the rotor blade, positioning the rotor blade between a first bladder support assembly fixedly mounted relative to the cart and a second bladder support assembly pivotally mounted relative to the cart, closing the second bladder support over the rotor blade, and applying pressure to the rotor blade.

In addition to one or more of the features described above or below, or as an alternative, further embodiments could include wherein applying pressure to the rotor blade includes inflating a first inflatable bladder arranged at the first bladder support assembly and a second inflatable bladder arranged at the second bladder support assembly.

In addition to one or more of the features described above or below, or as an alternative, further embodiments could include equalizing pressure in the first inflatable bladder and the second inflatable bladder.

In addition to one or more of the features described above or below, or as an alternative, further embodiments could include centering an area to be repaired on the rotor blade relative to the first bladder support assembly and the second bladder support assembly.

In addition to one or more of the features described above or below, or as an alternative, further embodiments could include applying heat to an area to be repaired on the rotor blade arranged between the first bladder support assembly and the second bladder support assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
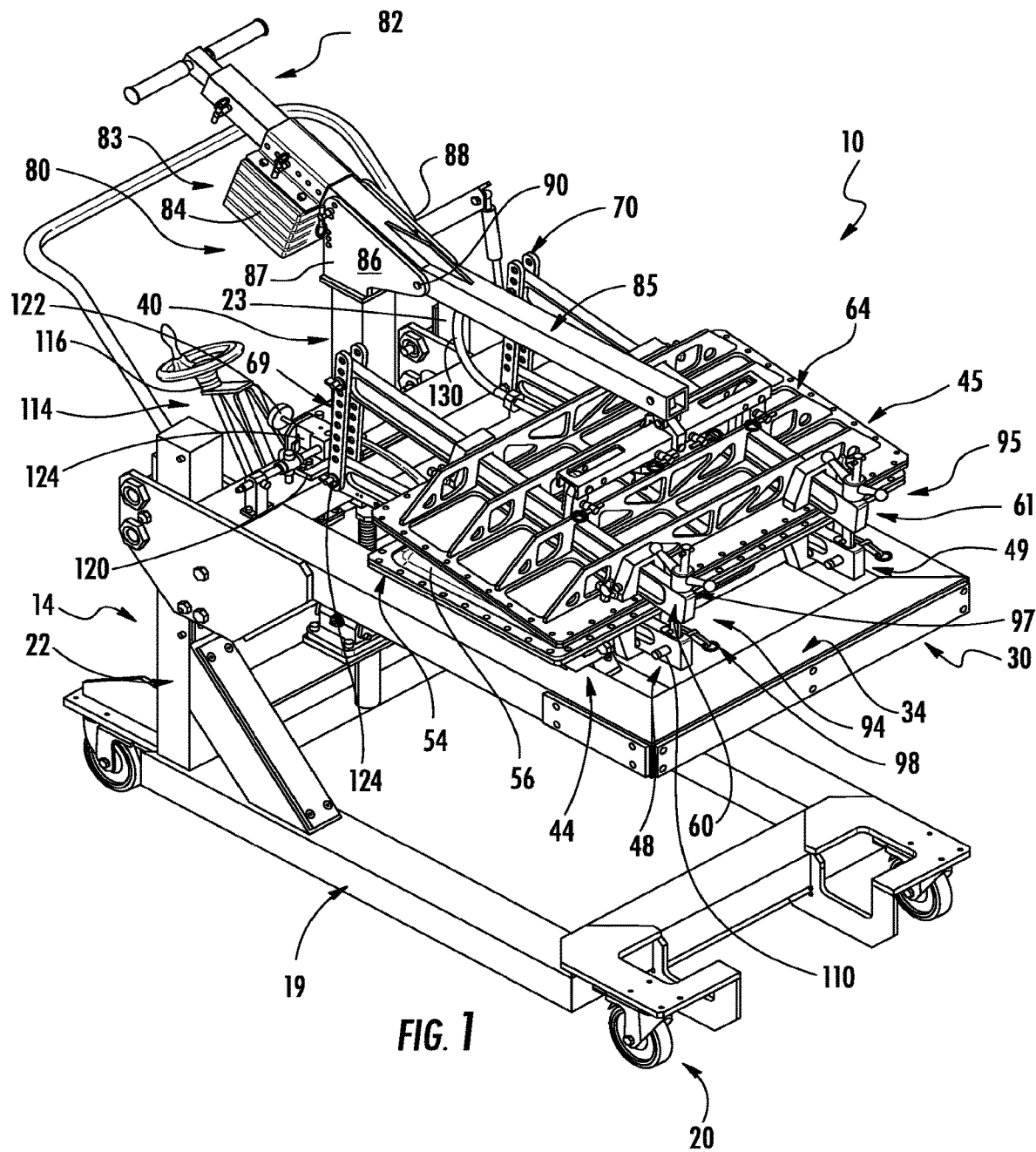
FIG. 1 depicts a perspective view of a mobile pressure tool for repairing rotor blades, in accordance with an exemplary embodiment.

A mobile pressure tool, in accordance with an aspect of an exemplary embodiment, is illustrated generally at 10 in FIG. 1. Mobile pressure tool 10 includes a mobile support system or cart 14 having a base member 19 provided with a number of wheel assemblies 20 that moveably support mobile support system 14 on a support surface, such as a floor (not separately labeled). Base member 19 also includes a first support arm 22 and a second support arm 23. First and second support arms 22 and 23 extend substantially perpendicularly from base member 19. A support platform 30 is supported by first and second support arms 22 and 23. As will be detailed more fully below, support platform 30 is vertically adjustable relative to the support surface.

Figure 2:
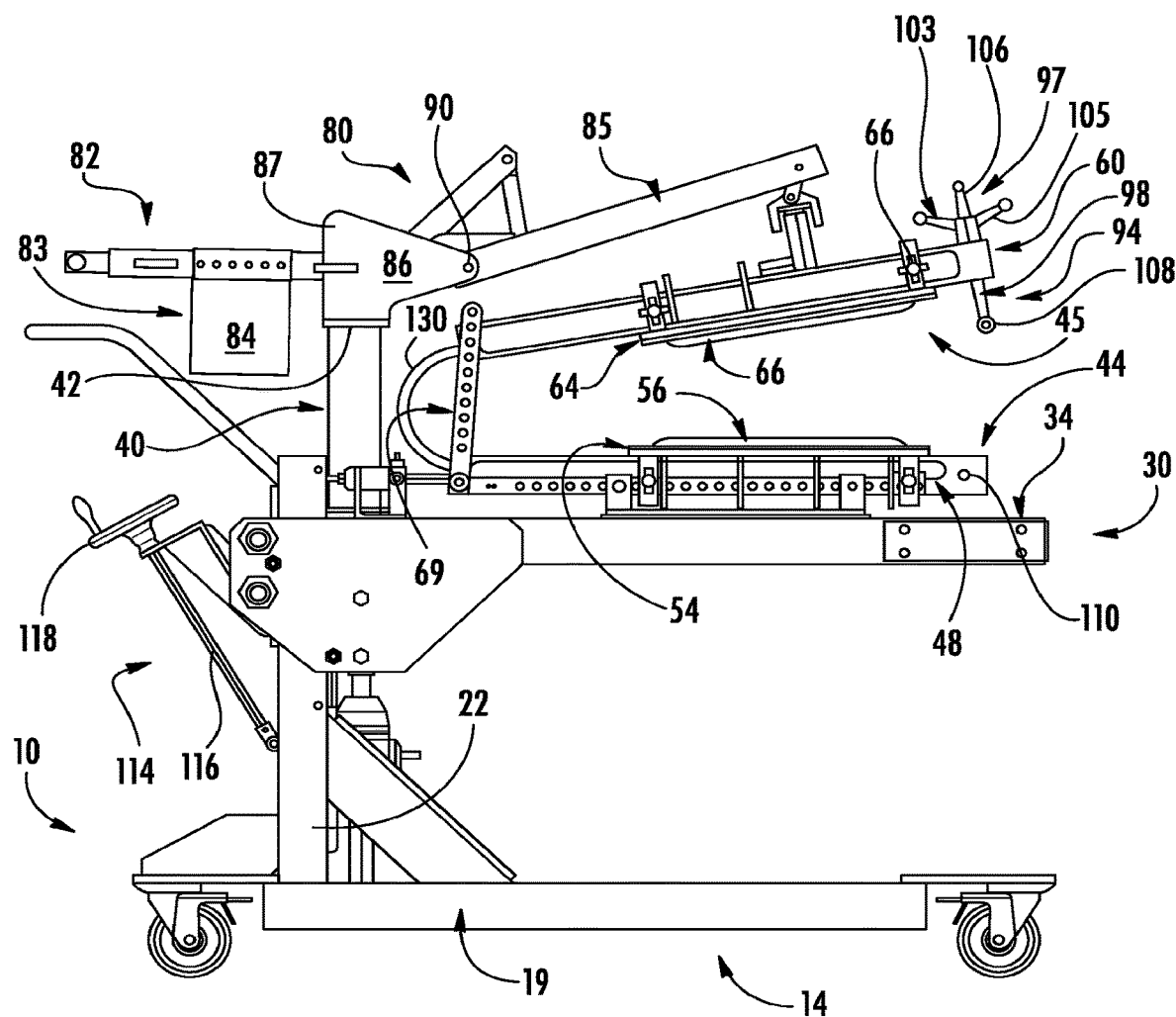
FIG. 2 depicts a side view of the mobile pressure tool of FIG. 1.
Figure 3:
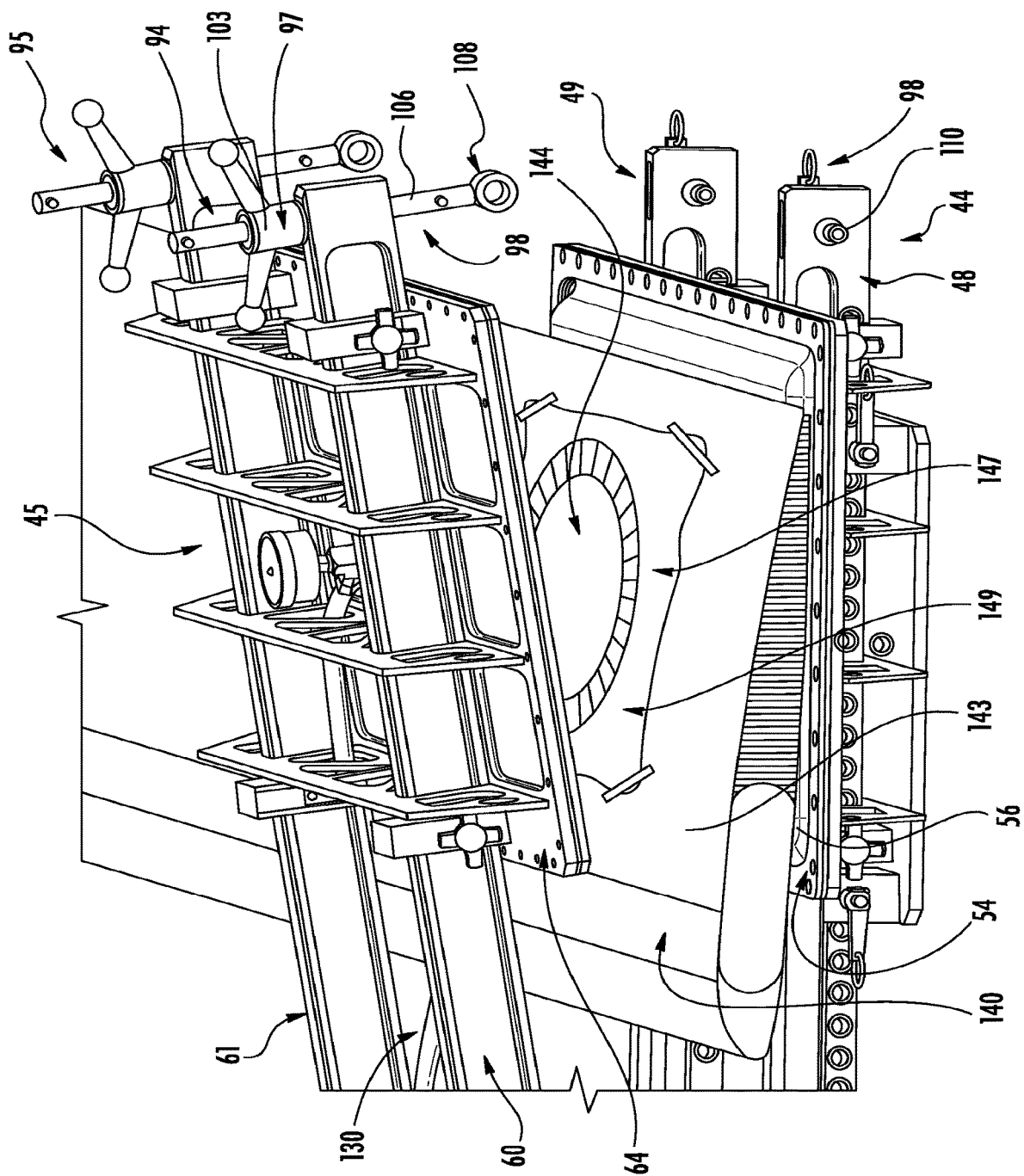
FIG. 3 depicts a rotor blade arranged in the mobile pressure tool of FIG. 1.

With continued reference to FIG. 1 and further reference to FIGS. 2 and 3, support platform 30 includes a support surface 34 and a beam member 40. Beam member 40 projects substantially perpendicularly relative to support surface 34 and includes a cantilevered end portion 42. A first bladder support assembly 44 is fixedly mounted relative to support surface 34 and a second bladder support assembly 45 is shiftably mounted relative to support surface 34 and first bladder support member 45.

In accordance with an aspect of an exemplary embodiment, first bladder support assembly 44 includes a first support arm 48 and a second support arm 49. Second support arm 49 extends substantially parallel to first support arm 48. A first bladder support 54 extends between first and second support arms 48 and 49. First bladder support 54 may selectively shift relative to first and second support arms 48 and 49 or be locked into position through a locking mechanism (not separately labeled). A first inflatable bladder 56 is provided at first bladder support 54.

Second bladder support assembly 45 includes a third support arm 60 and a fourth support arm 61. Fourth support arm 61 extends substantially parallel to third support arm 60. A second bladder support 64 extends between third and fourth support arms 60 and 61. Second bladder support 64 may selectively shift relative to third and fourth support arms 60 and 61 or be locked into position through a locking mechanism (not separately labeled). A second inflatable bladder 66 is provided at second bladder support 64. A first linking member assembly 69 may be employed to mechanically connect first support arm 48 with third support arm 60. A second linking member assembly 70 may be employed to mechanically connect second support arm 49 and fourth support arm 61.

Mobile pressure tool 10 also includes an activation mechanism 80 including an adjustable handle portion 82 provided with member 83, such as a counter-weight 84 and a force application portion 85. Member 83 may take on a variety of forms including springs, hydraulic actuators and the like that may counter a weight of second bladder support assembly 45. Activation mechanism 80 is supported at cantilevered end portion 42 of beam member 40 through a pivot member 86. Pivot member 86 includes a first side portion 87 and an opposing second side portion 88 with activation mechanism 80 extending therebetween. Activation mechanism 80 pivots about a fulcrum 90 defined by pivot member 86. As will be detailed more fully below, activation mechanism 80 is selectively employed to pivot second bladder support assembly 45 relative to first bladder support assembly 44.

Mobile pressure tool 10 further includes a first latch member 94 and a second latch member 95 for securing second bladder support assembly 45 to first bladder support assembly 44. As each latch member 94, 95 is substantially similarly constructed, a detailed description will follow with respect to first latch assembly 94 with an understanding that second latch assembly 95 may include similar structure. First latch member 94 includes a first portion 97 mounted to second bladder support assembly 45 and a second portion 98 mounted to first bladder support assembly 44. First portion 97 takes the form of a tension adjustment member 103 having a handle section 105 operatively coupled to a threaded rod section 106. Threaded rod section 106 includes a terminal end section (not separately labeled) provided with an eye portion 108. Second portion 98 take the form of a pin 110 that projects outwardly of first support arm 48. Eye portion 108 receives pin 110 and handle section 105 is rotated to selectively tighten or loosen latch member 94.

In further accordance with an exemplary aspect, mobile pressure tool 10 includes an adjustment mechanism 114 that may be operated to adjust a vertical height of support platform 30. Adjustment mechanism 114 may take the form of a screw jack 116 having a handle 118. Mobile pressure tool 10 also includes a fluid delivery system 120 that selectively introduces fluid, such as air, into first inflatable bladder 56 and second inflatable bladder 66. Fluid delivery system 120 includes a knob 122 that controls a valve 124 coupled between a source of fluid (not shown) and first and second inflatable bladders 56, 66. A cross-over conduit 130 fluidically connects first and second inflatable bladders to establish a desired pressure equilibrium. A pressure gauge (not separately labeled) may be employed to monitor and aid in establishing a desired pressure.

In accordance with an aspect of an exemplary embodiment, a method of repairing a rotor blade in accordance with an exemplary aspect will be described. Mobile pressure tool 10 is wheeled over to a rotor blade 140 having surface 143 with an area 144 in need of repair. Activation mechanism 80 is manipulated to pivot second bladder support assembly 45 to an open position such as shown in FIG. 3. Adjustment mechanism 114 may be manipulated to establish a desired vertical height of support platform 30. First and second bladder supports 54 and 64 may also be shifted to a desired position. Rotor blade 140 is positioned between first and second bladder support assemblies 44 and 45 with the area in need of repair 144 being centered between first and second inflatable bladders 56 and 66. A patch 147 may be positioned on surface 143 at the area in need of repair 144. A film 149 may be placed over patch 147. Second bladder support assembly 45 is moved toward first bladder support assembly 44 and locked into position with first and second latch members 94 and 95. First and second latch members 94 and 95 may be selectively adjusted to achieve a desired tension on surface 143.

First and second bladder supports 54 and 64 may be released so as to freely move along respective ones of first and second support arms 48, 49 and third and fourth support arms 60, 61. Knob 122 of fluid delivery system 120 may be manipulated to introduce a fluid into first and second inflatable bladders 56 and 66 to establish a desired pressure on surface 143. Fluid flows through cross-over conduit 130 thereby equalizing pressure in first inflatable bladder 56 and second inflatable bladder 66. After a desired period of time, the fluid may be released from first and second inflatable bladders 56 and 66. First and second bladder supports 54 and 64 may be locked in position, latching members 94 and 95 release, and second bladder support assembly 45 opened. Mobile pressure tool may be moved away from rotor blade 140.

It is to be understood that prior to closing second bladder support assembly 45 a heat source, such as a heated blanket 160 may be placed over patch 147 and/or film 149 to aid in activating an adhesive (not shown). It is also to be understood that the use of mobile pressure tool 10 eliminates the application of any bending moments that might be applied to rotor blade 140. The elimination of bending moments is further enhanced by allowing first and second bladder supports 54 and 64 to freely shift while introducing fluid into first and second inflatable bladders 56 and 66. It is to be still further understood, that mobile pressure tool 10 allows a technician to repair a rotor blade without the need for further support. It is to be understood, that while described in terms of repairing a rotor blade, the exemplary embodiments may also be employed during other rotor blade processes, such as manufacturing.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of repairing a rotor blade comprising:
   rolling a pressure tool mounted to a cart to the rotor blade;
   positioning the rotor blade between a first bladder support assembly fixedly mounted relative to the cart and a second bladder support assembly pivotally mounted relative to the cart;
   closing the second bladder support assembly over the rotor blade; and
   applying pressure to the rotor blade.

2. The method of claim 1, wherein applying pressure to the rotor blade includes inflating a first inflatable bladder arranged at the first bladder support assembly and a second inflatable bladder arranged at the second bladder support assembly.

3. The method of claim 2, further comprising:
   equalizing pressure in the first inflatable bladder and the second inflatable bladder.

4. The method of claim 1, further comprising:
   centering an area to be repaired on the rotor blade relative to the first bladder support assembly and the second bladder support assembly.

5. The method of claim 1, further comprising:
   applying heat to an area to be repaired on the rotor blade arranged between the first bladder support assembly and the second bladder support assembly.

6. The method of claim 2, further comprising:
   directing fluid to at least one of the first inflatable bladder and the second inflatable bladder.

7. The method of claim 1, further comprising:
   connecting the first bladder support assembly and the second bladder support assembly through a linking member.

8. The method of claim 1, further comprising:
   selectively shifting, by the activation member, the second bladder support assembly relative to the first bladder support assembly.

9. The method of claim 1, further comprising:
   supporting the first bladder support assembly through a first support arm; and
   supporting the second bladder support assembly through a second support arm.

10. The method of claim 1, further comprising:
    coupling at least one latch member to at least one of the first bladder support assembly and the second bladder support assembly; and
    securing the first bladder support assembly to the second bladder support assembly.

11. The method of claim 1, wherein applying pressure to the rotor blade includes applying pressure, by an activation member coupled to the second bladder support assembly and pivotally mounted to a beam member extending outwardly from the cart, to the rotor blade.

12. A pressure tool for rotor blade repair comprising:
    a mobile support system including a support surface;
    a first bladder support assembly including a first inflatable bladder fixedly mounted to the support surface;
    a second bladder support assembly including a second inflatable bladder pivotally mounted relative to the support surface;
    an activation mechanism operatively coupled to the second bladder support assembly, the activation mechanism being operable to selectively shift the second bladder support assembly relative to the first bladder support assembly;
    a fluid delivery system operable to direct a fluid into each of the first inflatable bladder and the second inflatable bladder;
    a base member operatively coupled to the support surface;
    a platform operatively coupled to the base member; and
    an adjustment mechanism operable to shift the platform relative to the base member.

13. The pressure tool for rotor blade repair according to claim 12, wherein the adjustment mechanism comprises a screw jack.

14. The pressure tool for rotor blade repair according to claim 12, wherein the base member includes one or more wheel assemblies operable to moveably support the mobile support system on a support surface.

15. The pressure tool for rotor blade repair according to claim 12, wherein the first inflatable bladder is fluidically connected to the second inflatable bladder.

16. The pressure tool for rotor blade repair according to claim 12, further comprising:

at least one latch member operatively coupled to one of the first and second bladder support assemblies.

17. A pressure tool for rotor blade repair comprising:
a mobile support system including a support surface;
a first bladder support assembly including a first inflatable bladder fixedly mounted to the support surface;
a second bladder support assembly including a second inflatable bladder pivotally mounted relative to the support surface;
an activation mechanism operatively coupled to the second bladder support assembly, the activation mechanism being operable to selectively shift the second bladder support assembly relative to the first bladder support assembly;
a fluid delivery system operable to direct a fluid into each of the first inflatable bladder and the second inflatable bladder; and
at least one latch member operatively coupled to one of the first and second bladder support assemblies, the at least one latch member being operable to secure the first bladder support assembly to the second bladder support assembly.

18. The pressure tool for rotor blade repair according to claim 17, wherein the at least one latch member includes a first portion mounted to the second bladder support assembly and a second portion fixedly mounted relative to the first bladder support assembly, the first portion including a tension adjustment member operable to establish a desired pressure between the first and second bladder support assemblies.

19. The pressure tool for rotor blade repair according to claim 18, further comprising:
first and second support arms supporting the first bladder support assembly, the second portion of the at least one latch member projecting outwardly of one of the first and second support arms.

* * * * *